United States Patent [19]

Akira et al.

[11] Patent Number: 4,874,510
[45] Date of Patent: Oct. 17, 1989

[54] FILTER FOR FUEL TANK

[75] Inventors: Mizusawa Akira; Kazumasa Kurihara, both of Yokohama, Japan

[73] Assignee: Nifco Inc., Yokohama, Japan

[21] Appl. No.: 180,704

[22] Filed: Apr. 7, 1988

Related U.S. Application Data

[63] Continuation of Ser. No. 946,819, Dec. 29, 1986, abandoned.

[30] Foreign Application Priority Data

Jan. 17, 1986 [JP] Japan .................................. 616271

[51] Int. Cl.4 ............................................. B01D 35/02
[52] U.S. Cl. .................................. 210/172; 210/460; 210/462
[58] Field of Search ............ 210/172, 232, 416.4, 210/438, 460, 461, 463, 485; 55/373, 374, 379; 240/168, 171, 486

[56] References Cited

U.S. PATENT DOCUMENTS

| | | | |
|---|---|---|---|
| 2,369,857 | 2/1945 | Russel et al. | 210/168 |
| 3,108,065 | 10/1963 | McMichael | 210/172 |
| 3,826,372 | 7/1974 | Bell | 210/460 |
| 3,833,124 | 9/1974 | Sugiyama et al. | 210/460 |
| 3,875,059 | 4/1975 | Mashino | 210/460 |
| 4,523,992 | 6/1985 | Sacket | 210/463 |
| 4,743,370 | 5/1988 | Mizusawa | 210/172 |
| 4,783,260 | 11/1988 | Kurihara | 210/232 |

FOREIGN PATENT DOCUMENTS 59-162354 9/1984 Japan .

Primary Examiner—W. Gary Jones
Assistant Examiner—Matthew D. Savage
Attorney, Agent, or Firm—Richard Bushnell

[57] ABSTRACT

A fuel tank filter comprises a sack-like filter net member having one portion fitted on and closely fastened to a mounting member mounted on an end of a suction pipe. A shape retaining means is disposed in the net member.

5 Claims, 4 Drawing Sheets

FIG. I
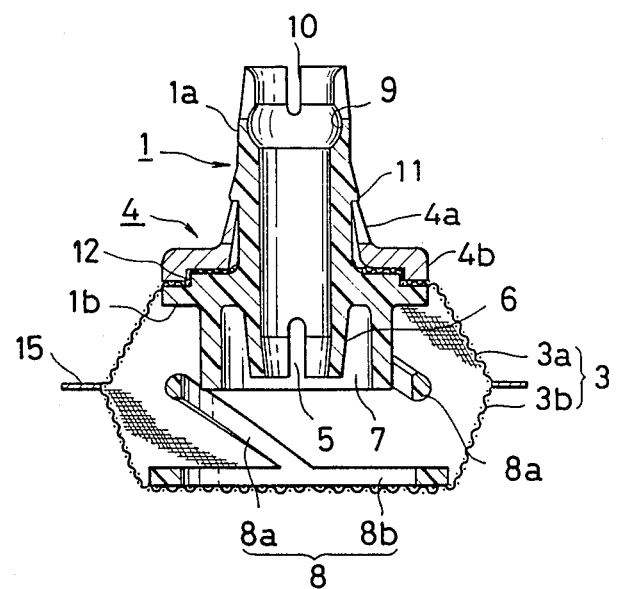
FIG. 2
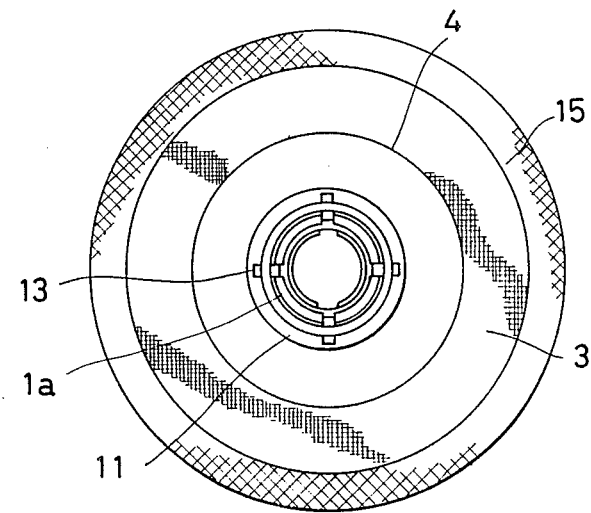

FILTER FOR FUEL TANK

This application is a continuation, of application Ser. No. 946,819, filed Dec. 29, 1986 now abandoned.

FIELD OF THE INVENTION AND RELATED ART STATEMENT

This invention relates to a filter for mounting on the end of a suction pipe inserted into a fuel tank, e.g. a gasoline tank, of an automobile for filtering impurities, e.g. dirt, ice crystals. etc., from the fuel being withdrawn into the suction pipe.

A filter is usually mounted on the suction pipe inserted into a gasoline tank of an automobile or the like for preventing the withdrawal of impurities.

Heretofore, filters consisting of corrosion resistant metal nets have been used for this purpose. These filters, however, are inferior in manufacturability and high in cost. Therefore, many automobiles now use a filter which consists of a synthetic resin frame molded with a metal or synthetic resin net member as an insert.

Examples of filters consisting of a synthetic resin molding are disclosed in Japanese Utility Model Publication Nos. SHO 52-37915, SHO 53-42840 and SHO 55-55784.

In these proposed filters, unlike earlier filters which had a metal frame assembled as a body, the frame itself is made of a synthetic resin. In addition, means for fastening the net member is provided when molding the frame, or the frame is molded with this means as an insert, thus simplifying the fastening operation and enhancing the manufaturability.

This synthetic resin filter is, however, still unsatisfactory in view of manufacturability, and improvements in this connection have been desired. Further, structural improvements have been desired for specific applications. More specifically, in the manufacture of the prior art synthetic resin filter, a substantially cylindrical synthetic resin frame is molded with a net member as an insert so that the net is held in a predetermined shape to provide the filter function. The manufacture of this filter, however, requires a step of molding the frame integrally with the net member. In addition, a support frame is required to maintain the shape of the net member, and the filtering area of the net is reduced correspondingly.

OBJECT AND SUMMARY OF THE INVENTION

An object of the invention is to provide a fuel tank filter with improved manufacturability, which can be manufactured inexpensively.

Another object of the invention is to provide a filter which has a substantially increased effective filtering area.

A still further object of the invention is to provide a filter having flexibility, which does not suffer a reduction of filter function when it is deformed, and which has a very long service life.

To attain the above objects of the invention, there is provided a fuel tank filter in which a portion of a sack-like filter net member is fitted on and closely fastened to a mounting member mounted on an end of a suction pipe, and shape retaining means is disposed in the net member.

More specifically, with the filter according to the invention, instead of adopting an assembled support frame for holding the net member taut in a predetermined shape, e.g. a cylindrical shape, the net member is formed as a mere sack, an opening of this sack-like net member is fitted on a mounting member mounted on a suction pipe, and shape retaining means, e.g. a frame, for holding the shape of the net member noted above is disposed within the net member.

The shape retaining means may have any desired shape. However, it desirably has an outer shape suited to hold the sack-like net member in an expanded state from the inside of the net member. Also it desirably is formed of resilient material so that its shape can deform and restore with deformation and restoration of the net member.

Further, the shape retaining means desirably is made of wires into a spherical or sack-like outer shape having a sufficient inside space, whereby it is possible to easily guide into the suction pipe fuel such as gasoline which has permeated through the net member into the inside space of the shape retaining means and to protect the net member from deterioration in permeability.

The filter having the above construction according to the invention is mounted on the end of a suction pipe inserted into a fuel tank. When fuel is withdrawn by the suction pipe, the entire surface of the sack-like net member serves to filter the fuel. In use, the net member is held in an expanded state by the inner shape retaining means, so that its entire surface can effectively function as a filtering area.

When the net member is pressed against the bottom or a side wall of the fuel tank or when it is pressed upon due to deformation of the tank caused by an external impact, the shape retaining means is deformed accordingly, whereby damage to the net member is avoided.

The above and other objects and features of the invention will become more apparent from the following detailed description with reference to the accompanying drawings.

BRIEF DESCRIPTION OF THE DRAWINGS

FIG. 1 is an axial sectional view showing an embodiment of the filter for a fuel tank according to the invention;

FIG. 2 is a plan view of the filter shown in FIG. 1;

DETAILED DESCRIPTION OF THE PREFERRED EMBODIMENTS

Figure 3:
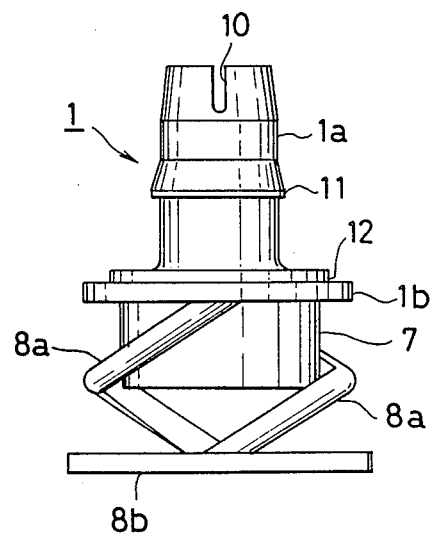
FIG. 3 is a front view showing a mounting member of the filter shown in FIG. 1.
Figure 4:
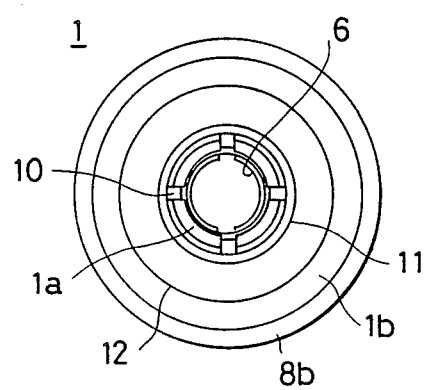
FIG. 4 is a plan view of the mounting member shown in FIG. 3.
Figure 5:
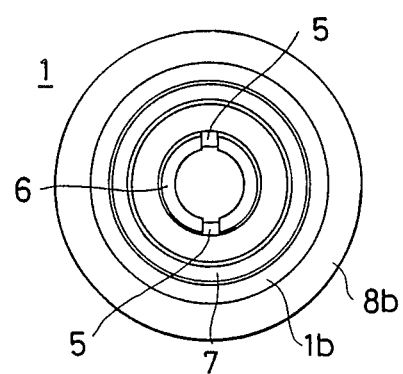
FIG. 5 is a bottom view of the mounting member shown in FIG. 3.
Figure 7:
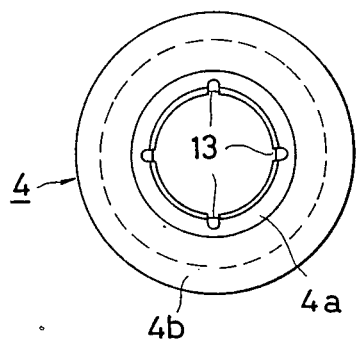
FIG. 7 is a plan view showing a mounting cover of the filter shown in FIG. 1.

FIGS. 1 to 7 show one embodiment of the fuel tank filter according to the invention. Referring to FIG. 1, reference numeral 1 designates a mounting member mounted on an end of a suction pipe inserted into a fuel tank, numeral 3 a net member attached to the mounting member so as to surround the end of the suction pipe, and numeral 4 a mounting cover for fastening the net member to the mounting member 1.

The mounting member is made of a synthetic resin. In this embodiment, the mounting member is constituted integrally of a cylindrical mounting portion 1a to be fitted on the suction pipe and a fastening portion 1b projecting like a flange from the outer periphery of the lower end of the mounting portion for attaching the net member 3. The mounting member 1 also has a squeezing portion 6 having axial slits 5, a cylindrical protective portion 7 surrounding the squeezing portion 6 and shape retaining means 8 surrounding and extending downwardly of the protective portion 7.

Figure 6:
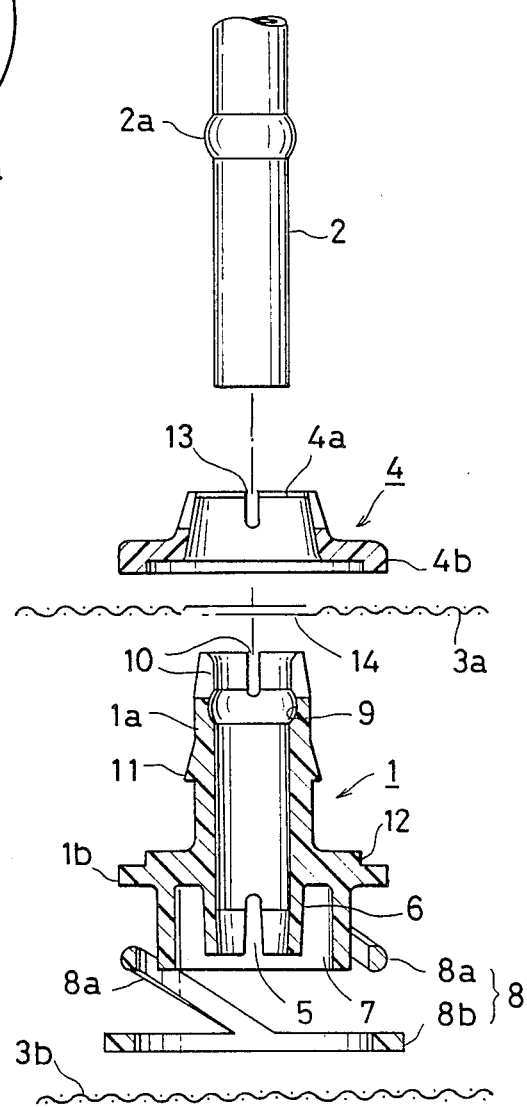
FIG. 6 is an exploded front view, partly in section, of the filter shown in FIG. 1.

The mounting portion 1a has an inner diameter matched to the outer diameter of the suction pipe. Its inner periphery is formed near the upper end with an annular recess 9 for receiving an annular raised portion 2a of the suction pipe 2 to prevent detachment (FIG. 6). Its upper open end portion is reduced in thickness and is formed with a plurality of axial slits 10 to facilitate the insertion of the suction pipe 2. Its outer periphery is formed at an axially intermediate portion with an annular locking portion 11 for locking the mounting cover 4.

The fastening portion 1b has a stepped upper portion 12 for holding an open portion of the net member 3. The squeezing portion 6 and the protective portion 7 concentrically surrounding the squeezing portion 6 depend from a central portion of the bottom of the fastening portion 1b.

The shape retaining means 8 serves to retain the net member 3 in an expanded state from the inside thereof when the net member is attached to the mounting member 1. In this embodiment, the shape retaining means 8 has two resilient arm portions 8a extending helically from the bottom of the fastening portion 1b so as to surround the protective portion 7 and a substantially flat ring member 8b spaced apart and parallel to the fastening portion 1b as best shown in FIG. 1.

Normally, the arm portions 8a of the shape retaining means 8 are in a non-contracted state so as to hold the ring member 8b below the protective portion 7. When an upward force is exerted on the ring member 8b, the arm portions are contracted so that the ring member 8b rises, at maximum up to the outer periphery of the protective portion 7. Further, when a sidewise external force is exerted on the ring member 8b, the arm portions 8a are flexed sidewise so that the ring member 8b is displaced sidewise from the position directly beneath the fastening portion 1b.

The mounting cover 4 is made of a thermoplastic synthetic resin having rigidity and elasticity like those of the mounting member 1. In the embodiment shown in FIG. 7, the cover member 4 is substantially disk-like and is fitted to the shape of the fastening portion 1b. It has a central cylindrical lock portion 4a projecting upwardly and a skirt-like clamping portion 4b downwardly extending from its outer edge. The lock portion 4a has a size suitable for fitting on the mounting portion 1a. Its thickness is reduced toward the upper end for enhanced flexibility. Further, it is provided with a plurality of axial slits 13 to provide spring action. The clamping portion 4b has an inner diameter sufficient to surround the stepped portion 12 of the fastening portion 1b, and has an axial dimension equal to the height of the stepped portion.

The net member 3 will now be described. In this embodiment, the net member 3 consists of two sheet-like synthetic resin net elements 3a and 3b, which are fused together along their edges into the form of a sack.

FIG. 6 shows the net elements 3a and 3b before formation of the net member 3. Referring to this figure, the net element 3a is formed with a hole 14. The hole 14 is fitted on the mounting portion 1a of the mounting member 1 such that the net element 3a extends along the top surface of the fastening portion 1b.

Then, the mounting cover 4 is passed on the mounting portion 1a so as to cover the net element 3a. At this time, the constricted upper end of the cover 4 is forcibly passed to clear the locking portion 11 of the mounting portion 1a. As a result, the mounting cover 4 is locked on the locking portion 11. Thus, a portion of the net member 3a surrounding the hole 14 is clamped between the clamping portion 4b and fastening portion 1b with the stepped portion 12.

After the net element 3a has been mounted on the mounting member 1 with the fitting of the mounting cover 4, the other net element 3b is laid on a flat surface, and the shape retaining means 8 of the mounting member is pressed against the net element 3b from above, causing the shape retaining means 8 to contract. In this state, the net element 3a mounted earlier is laid over the net element 3b. Then the overlapped net elements 3a and 3b are thermally fused together along their edges at positions along a circle surrounding the shape retaining means 8. The portions of the net elements outside the fused portion 15 are cut away, thus forming the sack-like net member 3.

FIG. 1 shows the filter after the net member 3 has been formed and the retaining means 8 has been returned to its normal state by the resilient force of the arm portions 8a. The net member, which has been formed by fusing together two net elements, is expanded into the form shown in FIG. 1 wherein it extends from a lower portion in contact with the ring member 8b, upwardly and outwardly to the fused portion 15 and then tapers inwardly and continues upwardly toward the mounting member fastening portion 1b.

Figure 8:
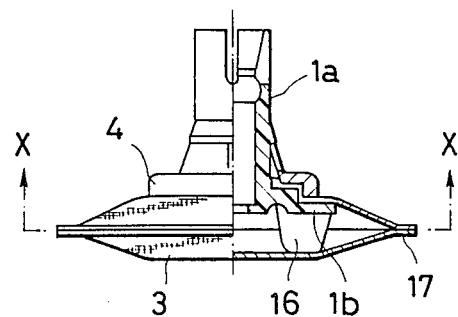
FIG. 8 is a front view with the right half in section showing a different embodiment of the filter according to the invention.
Figure 9:
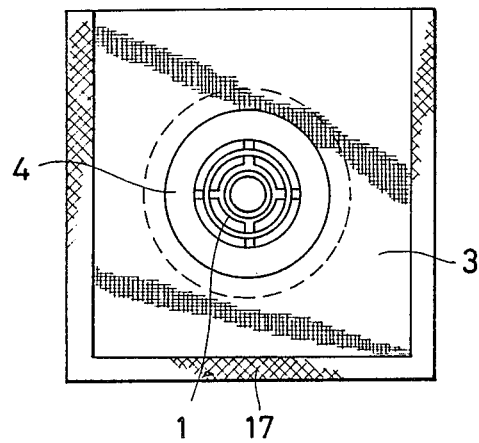
FIG. 9 is a plan view of the filter shown in FIG. 8.
Figure 10:
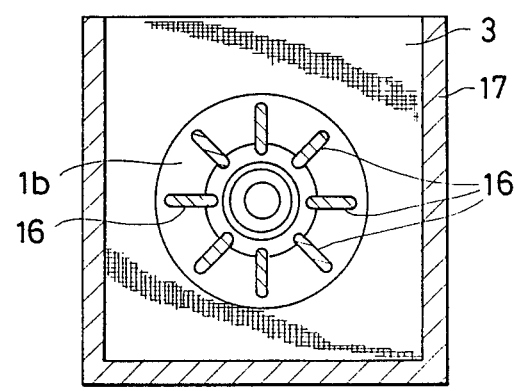
FIG. 10 is a sectional view taken along line X—X in FIG. 8.

FIGS. 8 to 10 show a different embodiment of the filter according to the invention. In this embodiment, the function of the shape retaining means consisting of the arm portions 8a and ring member 8b is provided by a plurality of radially spaced-apart elastic ridges 16 depending from the bottom of the flange-like fastening portion 1b of the mounting member 1. The elastic ridges 16 together constitute the shape retaining means. Further, a single net member is folded into two sections. One of the two sections is formed with a hole like the hole 14 noted before. The hole is fitted on the mounting portion 1a and secured to the same by fitting the mounting cover 4. Then, the section is overlapped over the other section, and the edges of the overlapped sections are thermally fused together, as shown at 17, thus forming the net member 3.

In either of the above embodiments, the shape retaining means is formed integrally with the mounting member 1 to depend from the bottom of the mounting portion 1b. However, it is possible to provide the shape retaining means separately.

The separately formed shape retaining means is desirably elastic and capable of contraction. Therefore, it is preferably in the form of a bucket or a spherical body formed of wires so that it has a large number of spaces and is elastic. The shape retaining means in the form of a bucket or a spherical body is adapted to be enclosed in the net member 3 at the time of the formation of the net member 3. By so doing, it is possible to obtain a filter comparable with one having an integral structure.

The mounting member and mounting cover are made of a synthetic resin to assure moldability and corrosion resistance.

A filter having the construction of one of the embodiments of the invention described in the foregoing, is mounted on an end of the suction pipe 2 inserted in a fuel tank so as to be at a predetermined position in the tank. To mount the filter on the pipe, the end of the pipe is forcibly inserted into the mounting portion 1a of the mounting member to fit the annular raised portion 2a in the recess 9. At the same time, the open top of the mounting member is brought into close contact with the pipe periphery, and the end of the pipe is passed through the squeezing portion 6, whereby the filter is securely mounted.

The filter having the above construction according to the invention thus can be readily and reliably secured to the suction pipe. In addition, unlike the case of the prior art filter, the net member secured to the mounting member is not inserted in a support frame, but its entire surface is exposed for filtering. Thus, the effective filtering area can be used most efficiently. Further, it is possible to reduce the size compared with the prior art filter.

Further, with the filter according to the invention the net member is supported from the inside by the inwardly sealed shape retaining means. Thus, compared with the prior art filter where the net member is inserted in the support frame and is integral with the shape retaining means, the net member can be moved freely and has freedom with respect to deformation. Therefore, when the net member strikes and is pressed against the inner wall of the fuel tank or when it is deformed with deformation of the tank itself caused by an external impact, no damage is caused, and there is no possibility of the portion of the filter mounted on the pipe being deformed to create a gap through which fuel can pass or to cause detachment of the filter.

Further, where an elastic restoring force is imparted to the shape retaining means, the above effect can be further enhanced, which is convenient for holding the net member in the best state at all times.

Filters of this kind are usually disposed near the tank bottom. Therefore, thanks to the deformability of the net member, the filter will function normally and satisfactorily even if it is pressed against the tank bottom when it is installed. This is effective in view of safety and is also highly effective in view of the operability, thus contributing to efficient production of automobiles or the like.

In the above embodiments, the net member is secured to the mounting member by fitting the mounting cover thereto. However, it is alternatively possible to mount the net member on the mounting member by other means. For example, the net member may be attached directly using an adhesive, or it may be secured by thermal fusion. Any mounting method may be selected so long as it ensures that the net member will not be detached and insures that there is no gap formed through which fuel good flow.

Obviously, many variations and modifications of the present invention can be made based on the above teachings. It is therefore to be understood that within the scope of the appended claims, the present invention may be practiced otherwise than as specifically described herein.

What is claimed is:

1. A fuel tank filter comprising: a mounting member provided on one end thereof with a cylindrical portion having a central bore for through passage of a fuel suction pipe and on the other end thereof with a squeezing portion having at least one slit for gripping securement to the pipe;
   a filter net member acting alone to filter fuel and having an opening fitter on and fastened to said mounting member; and
   shape retaining means formed integrally with and supported by said mounting member, and disposed inside said net member, said shape retaining means comprising resilient means arranged in annular pattern engaging and resliliently maintaining a circular portion of said filter net member substantially flat, said filter net member extending from said circular portion toward said mounting member and outwardly from said circular portion to a margin of maximum diameter and then tapering inwardly from said margin of maximum diameter to said mounting member.

2. The fuel tank filter according to claim 1, wherein a flange-like net member fastening portion projects from an outer periphery of said other end of said mounting member.

3. The fuel tank filter according to claim 1, wherein said shape retaining means includes two elastic arm portions extending downwardly from said mounting member and a ring portion secured to free ends of said arm portions and spaced apart from and facing said mounting member.

4. The fuel tank filter according to claim 1, wherein said shape retaining means consists of a plurality of radially spaced-apart ridges depending from said mounting member.

5. The fuel tank filter according to claim 1, wherein said filter net member comprises two synthetic resin net elements fused along the edges thereof.

* * * * *